United States Patent
Tripathi

(10) Patent No.: US 12,214,892 B2
(45) Date of Patent: Feb. 4, 2025

(54) ONE-WAY SPEED LIMITER FOR A POWER DOOR OPENING SYSTEM FOR AN AIRCRAFT

(71) Applicant: Hamilton Sundstrand Corporation, Charlotte, NC (US)

(72) Inventor: Amit Kumar Tripathi, Uttar Pradesh (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 168 days.

(21) Appl. No.: 17/967,985

(22) Filed: Oct. 18, 2022

(65) Prior Publication Data

US 2024/0060344 A1   Feb. 22, 2024

(30) Foreign Application Priority Data

Aug. 20, 2022   (IN) .............................. 202211047480

(51) Int. Cl.
| | |
|---|---|
| *F16D 41/04* | (2006.01) |
| *B64D 29/06* | (2006.01) |
| *F16D 43/24* | (2006.01) |
| *F16D 41/069* | (2006.01) |

(52) U.S. Cl.
CPC ............. *B64D 29/06* (2013.01); *F16D 41/04* (2013.01); *F16D 43/24* (2013.01); *E05Y 2201/26* (2013.01); *E05Y 2900/502* (2013.01); *F16D 41/069* (2013.01)

(58) Field of Classification Search
CPC ......... B64D 29/06; F16D 41/04; F16D 43/24; F16D 41/069; E05Y 2201/26; E05Y 2900/502; E05Y 2201/216; E05Y 2201/234; E05F 15/611; B64C 1/1446
See application file for complete search history.

(56) References Cited

U.S. PATENT DOCUMENTS

| | | |
|---|---|---|
| 8,393,568 B2 | 3/2013 | Maresko et al. |
| 9,650,917 B2 | 5/2017 | Stewart et al. |
| 9,703,312 B2 | 7/2017 | Larson |
| (Continued) | | |

OTHER PUBLICATIONS

European Application No. 23191171.0 filed Aug. 11, 2023; Extended European Search Report dated Feb. 2, 2024; 7 pages.

*Primary Examiner* — Jacob S. Scott
*Assistant Examiner* — Farhana Pervin
(74) *Attorney, Agent, or Firm* — CANTOR COLBURN LLP

(57) ABSTRACT

A one-way speed limiter includes a first housing including an inner surface. defining a speed limiter receiving zone. A second housing includes a flange and a second wall including an inner surface portion that includes a stop feature. A ball housing including a ball member is rotatably supported in the speed limiter receiving zone. The ball member selectively engages the stop feature. A friction clutch is disposed between the ball housing and the first housing. The friction clutch selectively retards rotation of the ball housing. A motor shaft is selectively rotatably connected to the ball housing. The motor shaft including a first end supported at the ball housing and a second end. The motor shaft is rotatable relative to the ball housing in a first direction and selectively rotatably constrained relative to the ball housing in a second direction to selectively engage the friction clutch.

20 Claims, 3 Drawing Sheets

(56) References Cited

U.S. PATENT DOCUMENTS

| | | |
|---|---|---|
| 10,378,263 B2 | 8/2019 | Podkopayev |
| 10,655,378 B2 | 5/2020 | Podkopayev |
| 10,683,691 B2 | 6/2020 | Podkopayev |
| 10,816,070 B2 | 10/2020 | Lagger et al. |
| 2017/0081017 A1* | 3/2017 | Barger .................... B64C 13/28 |
| 2018/0346138 A1* | 12/2018 | Ridray .................. B64D 27/40 |
| 2021/0071461 A1 | 3/2021 | Pandian |
| 2021/0094697 A1* | 4/2021 | Pretty .................... B64D 29/06 |
| 2022/0126982 A1* | 4/2022 | Kulkarni ................ F16D 59/00 |

* cited by examiner

ONE-WAY SPEED LIMITER FOR A POWER DOOR OPENING SYSTEM FOR AN AIRCRAFT

CROSS-REFERENCE TO RELATED APPLICATIONS

This application claims priority to Indian Patent Application No. 202211047480 filed Aug. 20, 2022, the contents of which are incorporated by reference herein in their entirety.

BACKGROUND

Exemplary embodiments pertain to the art of aircraft and, more particularly, to a one-way speed limiter for a power door opening system (PDOS) for an aircraft.

Outward opening doors, such as may be found on an aircraft engine nacelle typically employ a hydraulic or an electric power door opening system (PDOS). The electric PDOS employs an actuator which generally includes a screw shaft and nut-based mechanism in which screw is rotating member while nut is translating member. The screw is driven by an electric motor via gear and clutch arrangement. Generally, the PDOS includes a no-back unit, which acts as one way clutch and allows free rotation of screw in extension direction and imposes a resistive torque which is directly proportional to axial load, in retraction direction. As such, the actuator can be retracted only by the motor. That is, if power to the motor is lost, the PDOS does not allow retraction of actuator. The no-back unit prevents the free rotation of the actuator needed to lower or close the door. Without the no-back unit, the actuator/door will retract at an uncontrolled rate.

BRIEF DESCRIPTION

Disclosed in accordance with a non-limiting example is a one-way speed limiter for a power door opening system mounted in an aircraft. The one-way speed limiter includes a first housing including a first wall including an outer surface and an inner surface. The inner surface defines a speed limiter receiving zone. A second housing extends into the first housing. The second housing includes a flange having an inner surface section and a second wall extending outwardly from the flange the second wall including an outer surface portion that engages with the inner surface of the first housing and an inner surface portion that includes a stop feature. A ball housing including a ball member is rotatably supported in the speed limiter receiving zone. The ball member selectively engages the stop feature to generate an axial force on the ball housing. A friction clutch is disposed between the ball housing and the first housing. The friction clutch selectively retards rotation of the ball housing. A motor shaft is selectively rotatably connected to the ball housing. The motor shaft including a first end supported at the ball housing and a second end. The motor shaft is rotatable relative to the ball housing in a first direction and selectively rotatably constrained relative to the ball housing in a second direction to selectively engage the friction clutch.

Additionally, or alternatively, in this or other non-limiting examples, the ball housing includes a central hub supporting a bearing and a one-way clutch axially spaced from the bearing, the motor shaft being operatively connected to the one-way clutch with the first end of the motor shaft being supported by the bearing.

Additionally, or alternatively, in this or other non-limiting examples, the one-way clutch comprises a sprag clutch.

Additionally, or alternatively, in this or other non-limiting examples, the ball housing includes a plurality of cups extending about and arranged radially outwardly of the central hub.

Additionally, or alternatively, in this or other non-limiting examples, the ball member comprises a ball arranged in one of the plurality of cups.

Additionally, or alternatively, in this or other non-limiting examples, the ball member includes a plurality of balls arranged in corresponding ones of the plurality of cups.

Additionally, or alternatively, in this or other non-limiting examples, the stop feature comprises an angled surface extending between an inner surface section of the flange and the inner surface portion of the second wall.

Additionally, or alternatively, in this or other non-limiting examples, the friction clutch comprises a friction plate supporting a plurality of skewed bearings.

Additionally, or alternatively, in this or other non-limiting examples, the one-way speed limiter is employed in combination with a motor connected to the motor shaft. The motor selectively rotates the motor shaft in the first direction and in the second direction. A door operatively connected to the motor shaft.

Additionally, or alternatively, in this or other non-limiting examples, the door is mounted on a door shaft that is operatively connected to the motor shaft through a gear system.

An aircraft in accordance with a non-limiting example includes a fuselage including a tail, a wing projecting outwardly from the fuselage, an engine including a cowl supported by one of the fuselage, and the wing, a door provided on one of the fuselage and the cowl. The door includes a power door opening system (PDOS) including a one-way speed limiter.

Additionally, or alternatively, in this or other non-limiting examples, the ball housing includes a central hub supporting a bearing and a one-way clutch axially spaced from the bearing, the motor shaft being operatively connected to the one-way clutch with the first end of the motor shaft being supported by the bearing.

Additionally, or alternatively, in this or other non-limiting examples, the one-way clutch comprises a sprag clutch.

Additionally, or alternatively, in this or other non-limiting examples, the ball housing includes a plurality of cups extending about and arranged radially outwardly of the central hub.

Additionally, or alternatively, in this or other non-limiting examples, the ball member comprises a ball arranged in one of the plurality of cups.

Additionally, or alternatively, in this or other non-limiting examples, the ball member includes a plurality of balls arranged in corresponding ones of the plurality of cups.

Additionally, or alternatively, in this or other non-limiting examples, the stop feature comprises an angled surface extending between an inner surface section of the flange and the inner surface portion of the second wall.

Additionally, or alternatively, in this or other non-limiting examples, the friction clutch comprises a friction plate supporting a plurality of skewed bearings.

Additionally, or alternatively, in this or other non-limiting examples, a motor connected to the motor shaft, the motor selectively rotating the motor shaft in the first direction and in the second direction, wherein the door is operatively connected to the motor shaft.

Additionally, or alternatively, in this or other non-limiting examples, the door is pivotally mounted to the cowl.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
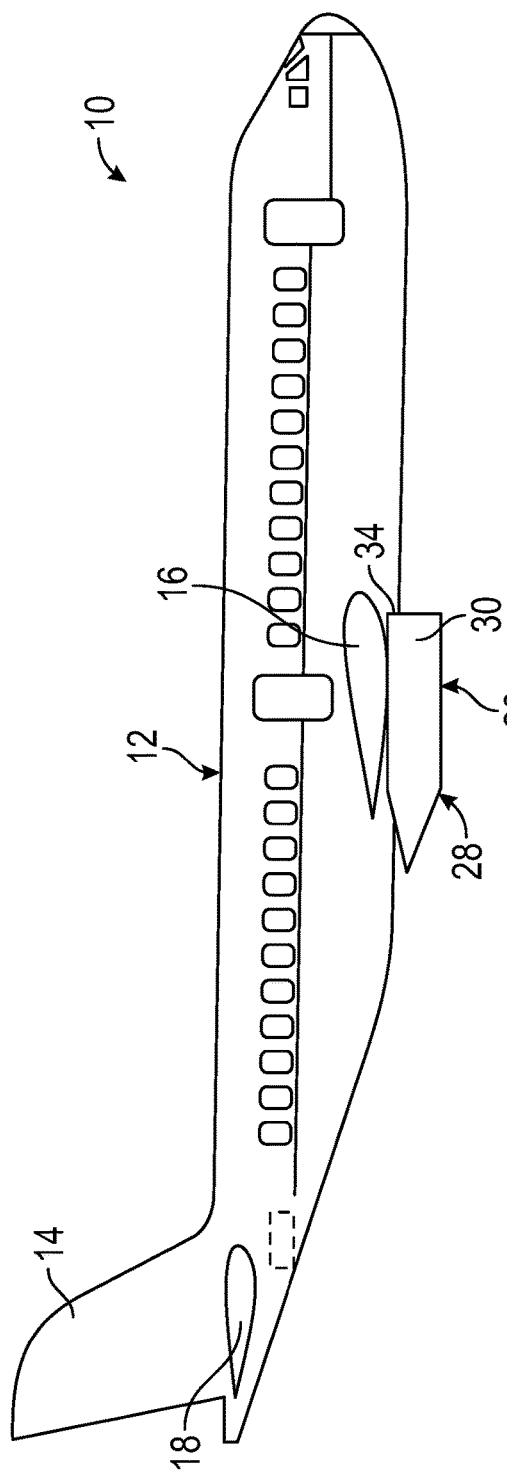
FIG. 1 is a side view of an aircraft including an engine nacelle having a power door opening system (PDOS) having a one-way speed limiter, in accordance with a non-limiting example.

An aircraft, in accordance with a non-limiting example, is indicated generally at 10 in FIG. 1. Aircraft 10 includes a fuselage 12 including a tail 14 and a wing 16. Tail 14 supports a horizontal stabilizer 18. Wing 16 supports an engine nacelle 20. It should be understood that aircraft 10 includes a second wing (not shown) that supports a second engine nacelle (also not shown). The number and mounting locations of the engine nacelles may vary.

Figure 2:
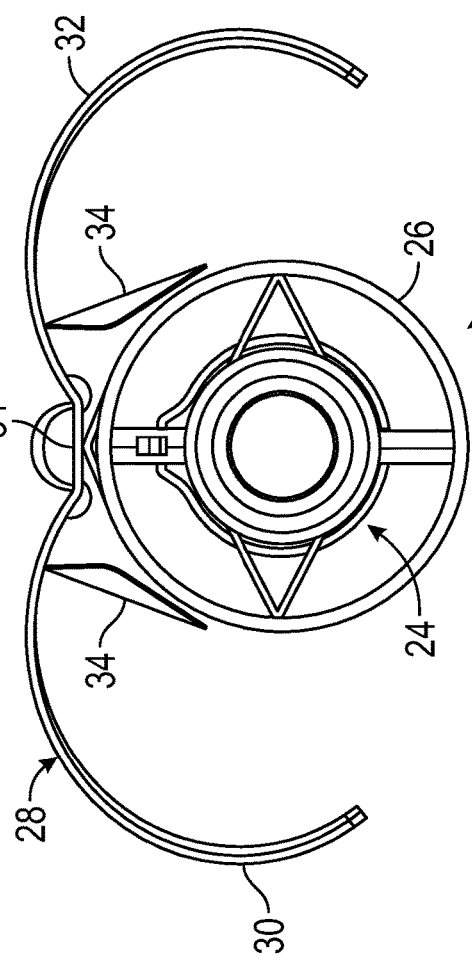
FIG. 2 is an axial end view of the engine nacelle of FIG. 1 with the doors shown in an open configuration, in accordance with a non-limiting example.

As shown in FIG. 2, engine nacelle 20 houses an engine 24. In a non-limiting example, engine nacelle 20 includes a frame 26 that supports cowl 28. Cowl 28 protects engine 24 from environmental effects. Cowl 28 includes a first door 30 and a second door 32 that are pivotally mounted to frame 26. First door 30 and second door 32 may be selectively opened to provide access to engine 24 for maintenance and the like. In a non-limiting example, first door 30 is connected to a power door opening system (PDOS) 34. Second door 32 may also be connected to PDOS 34. PDOS 34 selectively opens and closes first door 30 and/or second door 32 to provide access to engine 24. Further, in an absence of power, PDOS 34 allows first door 30 and/or second door 32 to be moved to a closed configuration in a controlled manner.

Figure 3:
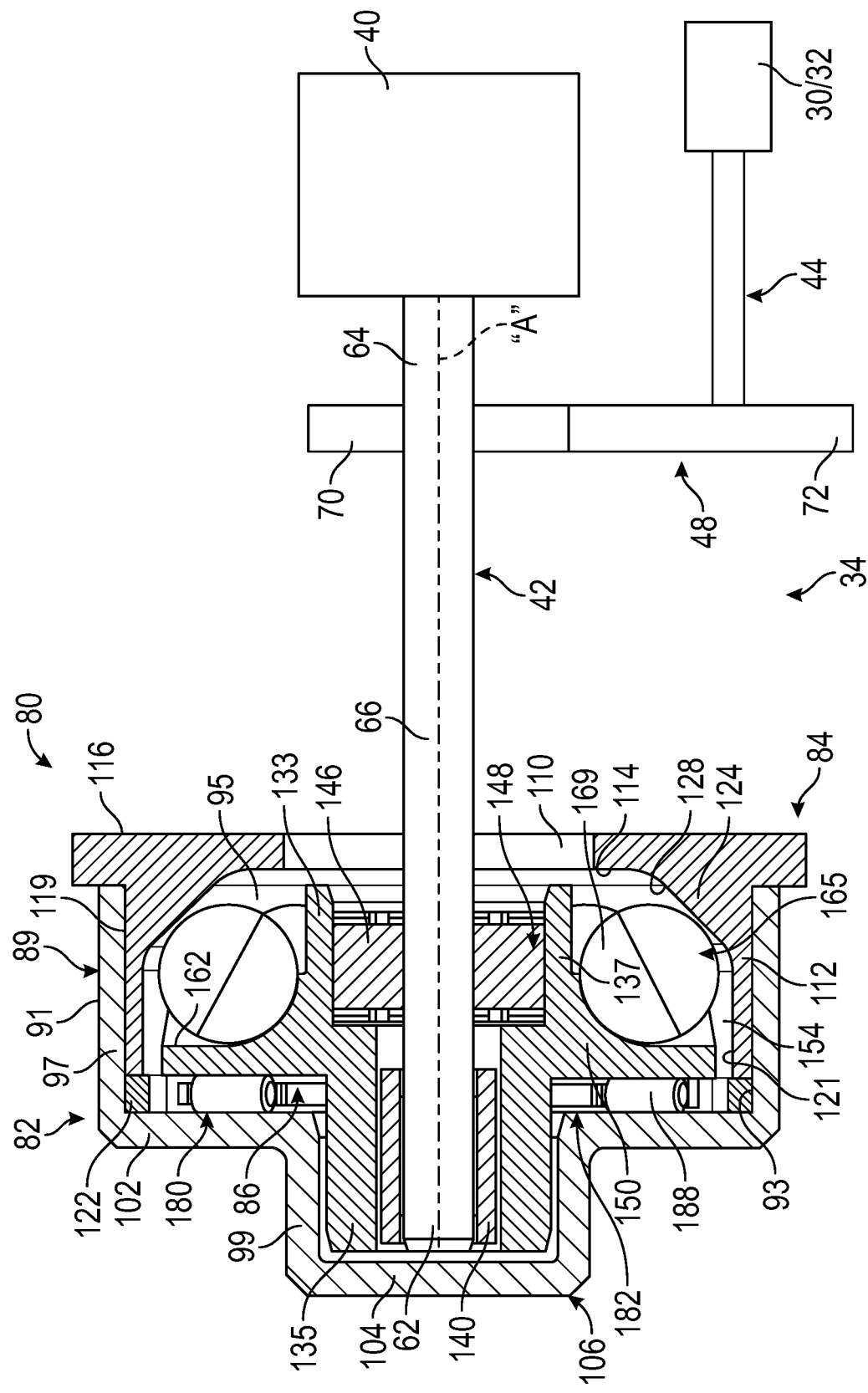
FIG. 3 a partial cross-sectional side view of the PDOS including the one-way speed limiter, in accordance with a non-limiting example.

Referring to FIG. 3, PDOS 34 includes a motor 40 connected to a motor shaft 42. Motor shaft 42 is connected to a door shaft 44 through a gear system 48. In accordance with a non-limiting example, door shaft 44 extends substantially parallel to motor shaft 42 and is operatively connected to first door 30 and/or second door 32. Of course, it should be understood that other arrangements of motor shaft 42 and door shaft 44 are also contemplated.

Motor shaft 42 includes a first end 62, a second end 64 connected to motor 40 and an intermediate portion 66 that is connected to gear system 48. That is, a first gear 70 of gear system 48 is mounted to intermediate portion 66 of motor shaft 42 and a second gear 72 is connected to door shaft 44. Operation of motor 40 causes first gear 70 to rotate second gear 72 which in turn rotates door shaft 44 to shift first door 30 and/or second door 32.

In a non-limiting example, a one-way speed limiter 80 is connected to first end 62 of motor shaft 42. One-way speed limiter 80 allows motor shaft 42 to freely move first door 30 and/or second door 32 to an open configuration as shown in FIG. 2 and mandates a controlled movement of motor shaft 42 to close first door 30. One-way speed limiter 80 includes a first housing 82, a second housing 84, and a ball housing 86 that is disposed between and encapsulated by, first housing 82 and second housing 84.

First housing 82 includes a first wall 89 that defines an outer surface 91 and an inner surface 93. Inner surface 93 defines, in part, a speed limiter receiving zone 95 within which is arranged ball housing 86. First wall 89 includes a first annular segment 97 connected to a second annular segment 99 by a first base wall 102. Second annular segment 99 extends outwardly from first base wall 102. A second base wall 104 is axially spaced from first base wall 102 and is connected to second annular segment 99. First annular segment 97 includes a first circumference and second annular segment 99 includes a second circumference that, in the non-limiting example shown, is smaller than the first circumference. Second annular segment 99 and second base wall 104 define a stopper housing support 106.

Second housing 84 includes a flange 110 through which passes motor shaft 42. A second wall 112 is connected to flange 110. Flange 110 includes an inner surface section 114 and an outer surface section 116. Second wall 112 extends substantially perpendicularly from inner surface section 114. Second wall 112 includes an outer surface portion 119 and an inner surface portion 121. Outer surface portion 119 and inner surface portion 121 are, in a non-limiting example, annular surfaces. Outer surface portion 119 abuts inner surface 93 of first wall 89. A shim 122 is disposed between second wall 112 and an inner surface (not separately labeled) of first base wall 102. Second housing 84 includes a stop feature 124 which, as will be detailed herein, that prevents uncontrolled rotation of motor shaft 42 in a door closing direction. Stop feature 124 is shown in the form of an angular surface 128 that extends between inner surface section 114 and inner surface portion 121.

In a non-limiting example, ball housing 86 includes a central hub 133 that includes a bearing portion 135 and a clutch portion 137. A bearing 140 is arranged in bearing portion 135. Bearing 140 supports first end 62 of motor shaft 42. Clutch portion 137 supports a one-way clutch 148 that is operatively connected with intermediate portion 66 of motor shaft 42. One-way clutch 148 may take the form of a sprag clutch 146 that allows motor shaft 42 to rotate in first direction to open first door 30 and or second door 32 and prevents uncontrolled rotation of motor shaft 42 in a second direction, that is opposite the first direction. That is, motor shaft 42 in the second direction allows first door 30 to close below a designed limiting speed. In second direction, motor shaft 42 and ball housing 86 rotate together due to one-way clutch 148.

Figure 4:
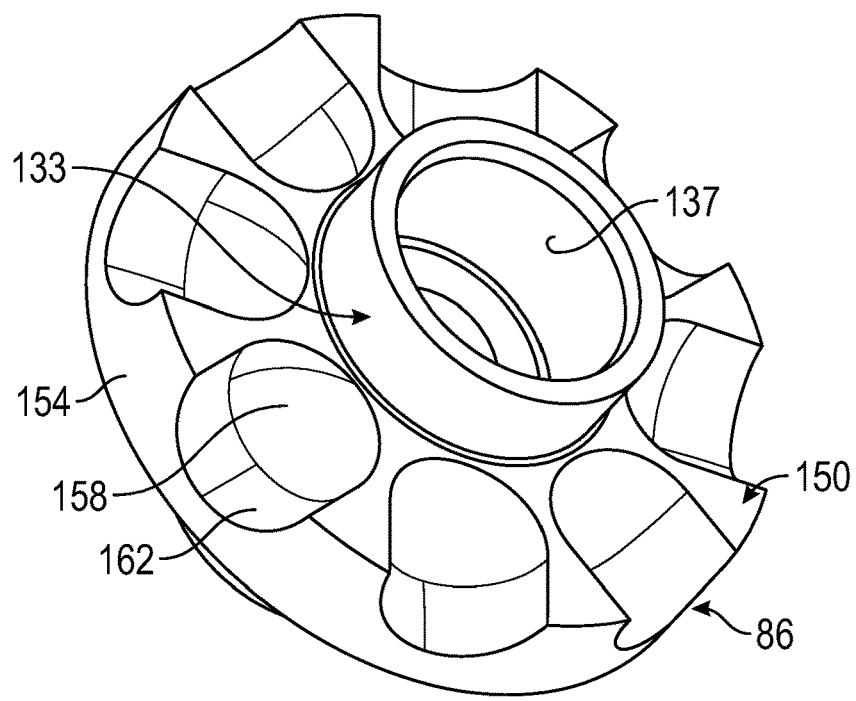
FIG. 4 is a perspective view of a ball housing portion of the on-way speed limiter; in accordance with a non-limiting example.
Figure 5:
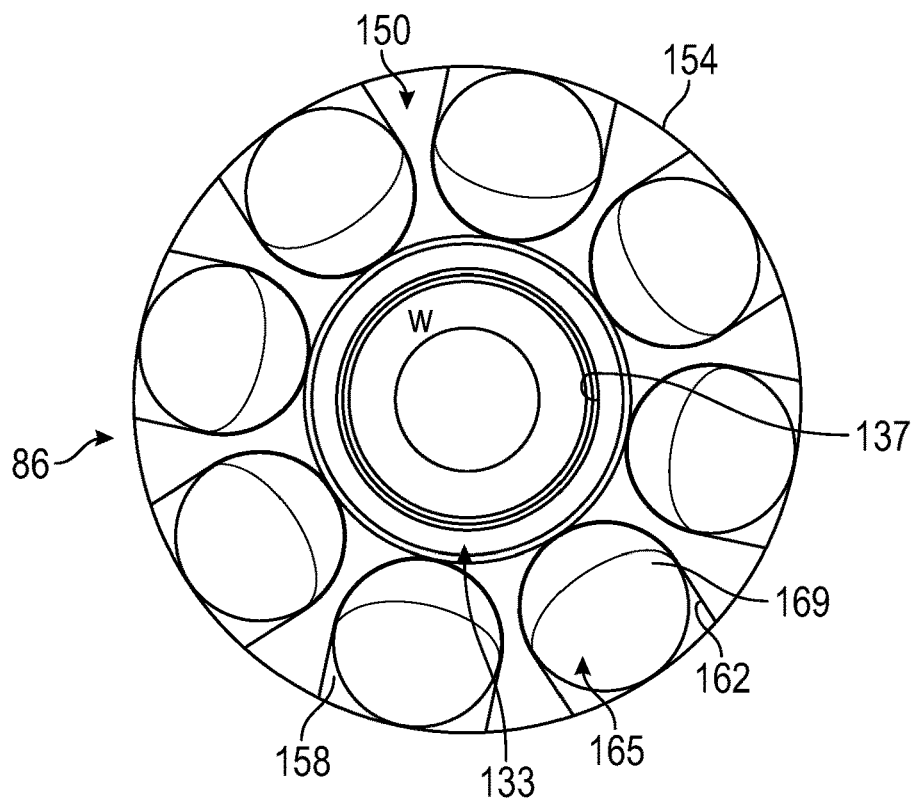
FIG. 5 is a plan view of a plurality of balls arranged in the ball housing of FIG. 4, in accordance with a non-limiting example.

In a non-limiting example shown in FIGS. 4 and 5, ball housing 86 includes a cup support 150 that extends radially outwardly of central hub 133. Cup support 150 includes an outwardly facing circumferential edge 154 that is radially spaced from central hub 133. A plurality of cups 158 are formed in cup support 150. The plurality of cups 158 extend circumferentially about cup support 150 between central hub 133 and outwardly facing circumferential edge 154. In a non-limiting example, each of the plurality of cups 158 includes an opening 162 positioned at outwardly facing circumferential edge 154.

In a non-limiting example, a ball member 165 is provided in each of the plurality of cups 158. Ball member 165 is shown in the form of a spherical ball 169. Of course, it should be understood that the particular shape of ball member 165 may vary. Ball members 165 rest freely in each of the plurality of cups 158. In the event that motor 40 loses power, motor shaft 42 will not spin out of control allowing first door 30 to fall closed.

Instead, rotation of motor shaft 42 will lock one-way clutch 148 to ball housing 86. Further rotation of motor shaft 42 will cause ball housing 86 to rotate causing ball members 65 to move outwardly into contact with angular surface 128. Contact between the ball members 65 and angular surface 128 generates an axial force that acts upon ball housing 86. As shown in FIG. 3 a friction clutch 180 is disposed between cup support 150 and an inner surface (not separately labeled) of first base wall 102. In a non-limiting example, friction clutch 180 takes the form of a friction plate 182 supporting a plurality of skewed roller bearings 188. The term "skewed roller bearings" should be understood to describe a roller bearing having an axis of rotation that is skewed relative to a radius extending from an axis of rotation "A" of motor shaft 42. Of course, it should be understood that friction clutch 180 could take on a variety of forms.

Loss of electrical power to motor 40 could cause first door 30 and or second door 32 to back drive motor shaft 42. Gravity, acting on first door 30 and/or second door 32, could cause a reverse rotation of motor shaft 42 and ball housing 86. due to back drive torque from door shaft 44. The reverse rotation of ball housing 86 will generate a force that urges ball members 165 radially outwardly and project through corresponding ones of openings 162.

At this point, ball members 165 will engage with and exert a force on stop feature 124. A reaction force on ball members 165 will urge ball housing 86 into contact with friction clutch 180. If rotational speed of the motor shaft 42 due to back drive forces reaches a designed limit, resistive torque from friction clutch 180 tends to exceed the back drive torque to retard rotation of motor shaft 42. However, motor shaft 42 rotates within a designed speed limit, friction clutch 180 will slip allowing first door 30 and or second door 32 to close. Thus, one-way speed limiter 80 will prevent first door 30 and/or second door 32 from falling closed in an uncontrolled manner if power to motor 40 is lost. However, one-way speed limiter 80 still allows a controlled closing of first door 30. That is, first door 30 may be slowly lowered, such as by a forklift, and closed without causing friction clutch 180 to fully engage.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A one-way speed limiter for a power door opening system mounted in an aircraft, the one-way speed limiter comprising:
    a first housing including a first wall including an outer surface and an inner surface, the inner surface defining a speed limiter receiving zone;
    a second housing extending into the first housing, the second housing including a flange having an inner surface section and a second wall extending outwardly from the flange, the second wall including an outer surface portion that engages with the inner surface of the first housing and an inner surface portion that includes a stop feature;
    a ball housing including a ball member is rotatably supported in the speed limiter receiving zone, the ball member selectively engaging the stop feature to generate an axial force on the ball housing;
    a friction clutch disposed between the ball housing and the first housing, the friction clutch selectively retarding rotation of the ball housing; and
    a motor shaft selectively rotatably connected to the ball housing, the motor shaft including a first end supported at the ball housing and a second end, the motor shaft being rotatable relative to the ball housing in a first direction and selectively rotatably constrained relative to the ball housing in a second direction to selectively engage the friction clutch.

2. The one-way speed limiter according to claim 1, wherein the ball housing includes a central hub supporting a bearing and a one-way clutch axially spaced from the bearing, the motor shaft being operatively connected to the one-way clutch with the first end of the motor shaft being supported by the bearing.

3. The one-way speed limiter according to claim 2, wherein the one-way clutch comprises a sprag clutch.

4. The one-way speed limiter according to claim 2, wherein the ball housing includes a plurality of cups extending about and arranged radially outwardly of the central hub.

5. The one-way speed limiter according to claim 4, wherein the ball member comprises a ball arranged in one of the plurality of cups.

6. The one-way speed limiter according to claim 5, wherein the ball member includes a plurality of balls arranged in corresponding ones of the plurality of cups.

7. The one-way speed limiter according to claim 2, wherein the stop feature comprises an angled surface extending between an inner surface section of the flange and the inner surface portion of the second wall.

8. The one-way speed limiter according to claim 1, wherein the friction clutch comprises a friction plate supporting a plurality of skewed bearings.

9. The one-way speed limiter according to claim 1, in combination with:
a motor connected to the motor shaft, the motor selectively rotating the motor shaft in the first direction and in the second direction; and
a door operatively connected to the motor shaft.

10. The one-way speed limiter according to claim 9, wherein the door is mounted on a door shaft that is operatively connected to the motor shaft through a gear system.

11. An aircraft comprising:
a fuselage including a tail;
a wing projecting outwardly from the fuselage;
an engine including a cowl supported by one of the fuselage, and the wing;
a door provided on one of the fuselage and the cowl, the door including a power door opening system (PDOS) including a one-way speed limiter as recited in claim 1.

12. The aircraft according to claim 11, wherein the ball housing includes a central hub supporting a bearing and a one-way clutch axially spaced from the bearing, the motor shaft being operatively connected to the one-way clutch with the first end of the motor shaft being supported by the bearing.

13. The aircraft according to claim 12, wherein the one-way clutch comprises a sprag clutch.

14. The aircraft according to claim 12, wherein the ball housing includes a plurality of cups extending about and arranged radially outwardly of the central hub.

15. The aircraft according to claim 14, wherein the ball member comprises a ball arranged in one of the plurality of cups.

16. The aircraft according to claim 15, wherein the ball member includes a plurality of balls arranged in corresponding ones of the plurality of cups.

17. The aircraft according to claim 12, wherein the stop feature comprises an angled surface extending between an inner surface section of the flange and the inner surface portion of the second wall.

18. The aircraft according to claim 11, wherein the friction clutch comprises a friction plate supporting a plurality of skewed bearings.

19. The aircraft according to claim 11, further comprising:
a motor connected to the motor shaft, the motor selectively rotating the motor shaft in the first direction and in the second direction, wherein the door is operatively connected to the motor shaft.

20. The aircraft according to claim 19, wherein the door is pivotally mounted to a frame.

* * * * *